(12) United States Patent
Lee

(10) Patent No.: US 7,467,441 B2
(45) Date of Patent: Dec. 23, 2008

(54) SHAFT STRUCTURE OF LIFTABLE SCREEN COVER

(75) Inventor: Shao-Ming Lee, Nan Tou (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 345 days.

(21) Appl. No.: 11/447,123

(22) Filed: Jun. 6, 2006

(65) Prior Publication Data

US 2007/0130729 A1     Jun. 14, 2007

(30) Foreign Application Priority Data

Dec. 13, 2005    (TW) .............................. 94221737 U

(51) Int. Cl.
     *E05D 5/00*      (2006.01)
(52) U.S. Cl. .......................... 16/382; 16/254
(58) Field of Classification Search ............... 16/382, 16/252, 254, 270, 261
See application file for complete search history.

(56) References Cited

U.S. PATENT DOCUMENTS

| | | | | |
|---|---|---|---|---|
| 5,507,072 A | * | 4/1996 | Youn ........................... | 16/261 |
| 5,724,704 A | * | 3/1998 | Seo ............................. | 16/254 |
| 6,202,256 B1 | * | 3/2001 | Bovio et al. .................. | 16/382 |
| 6,698,063 B2 | * | 3/2004 | Kim et al. ..................... | 16/337 |
| 6,804,859 B2 | * | 10/2004 | Lu et al. ....................... | 16/342 |

* cited by examiner

*Primary Examiner*—William L. Miller
(74) *Attorney, Agent, or Firm*—Rosenberg, Klein & Lee

(57) ABSTRACT

A shaft structure of a liftable screen cover includes a screen cover, a cover reinforcement plate and a shaft set. The side of the screen cover is formed with a bent sidewall. One end of the sidewall has a non-circular first hole. The cover reinforcement plate disposes inside the sidewall. One end of the cover reinforcement plate has a non-circular second hole. A fulcrum is formed between the sidewall of the screen cover and the cover reinforcement plate and connected in a male-and-female engagement. As a result, the fulcrum of the shaft can be greatly elongated. One end of the shaft center of the shaft set has a non-circular flange. The flange penetrates into the second hole and the first hole. Screws are used to fix the screen cover, the cover reinforcement plate and the shaft set. With the above arrangement, a structure has good rigidity and bears larger torsion.

9 Claims, 4 Drawing Sheets

SHAFT STRUCTURE OF LIFTABLE SCREEN COVER

BACKGROUND OF THE INVENTION

1. Field of the Invention

The present invention relates to a shaft structure of a liftable screen cover, and in particular to a shaft structure of a screen cover, which has a good rigidity, bears the torsion of the shaft and can be applied to a thin plate screen cover made by press-forming the aluminum alloy or magnesium alloy or a screen cover made by molding carbon fibers.

2. Description of Prior Art

With the development of various kinds of information products, people require that these information products should provide more and more functions with higher quality. Especially, it is an important issue for the manufacturers of notebooks to develop a new product that is more convenient and efficient to use. Such performance is an important index for evaluating the manufacturing technique of the manufactures and determining the leadership in this field of art.

The conventional screen cover of the notebook can be categorized into three kinds according to its material, that is, aluminum alloy, plastics and magnesium-aluminum alloy. The screen cover made of plastics and magnesium-aluminum alloy is a cast and can be formed with reinforcement protrusions. However, for the screen cover made of the aluminum alloy, it is difficult to be formed with reinforcement protrusions because it is a thin screen cover made by press-forming the aluminum alloy. Therefore, such screen cover has a bad rigidity and thus is difficult to bear the torsion of the shaft. If complicated reinforcement structures are additionally provided, it will cause the complication of the whole structure and greatly increase the cost.

Further, when the conventional screen cover is subjected to a twisting force, since the force arm formed by the screen cover is larger and the fulcrum of the shaft is shorter, it is difficult to provide a good rigidity. As a result, deformation and vibration of the screen occur easily. The shaft bears a larger torsion, so that the screw for tightening the shaft will get loosened.

In view of the above, the inventor proposes the present invention to overcome the above problems based on his expert experiences and deliberate researches.

SUMMARY OF THE INVENTION

The primary object of the present invention is to provide a shaft structure of a liftable screen cover, which has a good rigidity and bears a larger torsion produced by the shaft. Therefore, when the screen is twisted, the deformation and vibration of the screen cannot occur. Further, the screw for tightening the shaft cannot get loosened. With the above arrangement, the whole structure is simple and easy to assemble, so that the manufacturing cost can be reduced.

In order to achieve the above objects, the present invention provides a shaft structure of a liftable screen cover, which comprises: a screen cover having a sidewall bent formed at a side of the screen cover, the sidewall having a non-circular first hole at one end thereof; a cover reinforcement plate placed inside the sidewall, the cover reinforcement plate having a non-circular second hole at one end thereof, a fulcrum formed between the sidewall of the screen cover and the cover reinforcement plate and connected in a male-and-female engagement; and a shaft set, having a non-circular flange at one end thereof, the flange of the shaft set penetrating into the second hole of the cover reinforcement plate and the first hole of the screen cover.

In order to further understand the characteristics and technical contents of the present invention, a detailed description relating to the present invention will be made with reference to the accompanying drawings. However, it should be understood that the drawings are illustrative only but not used to limit the scope of the present invention.

DETAILED DESCRIPTION OF THE INVENTION

Figure 1:
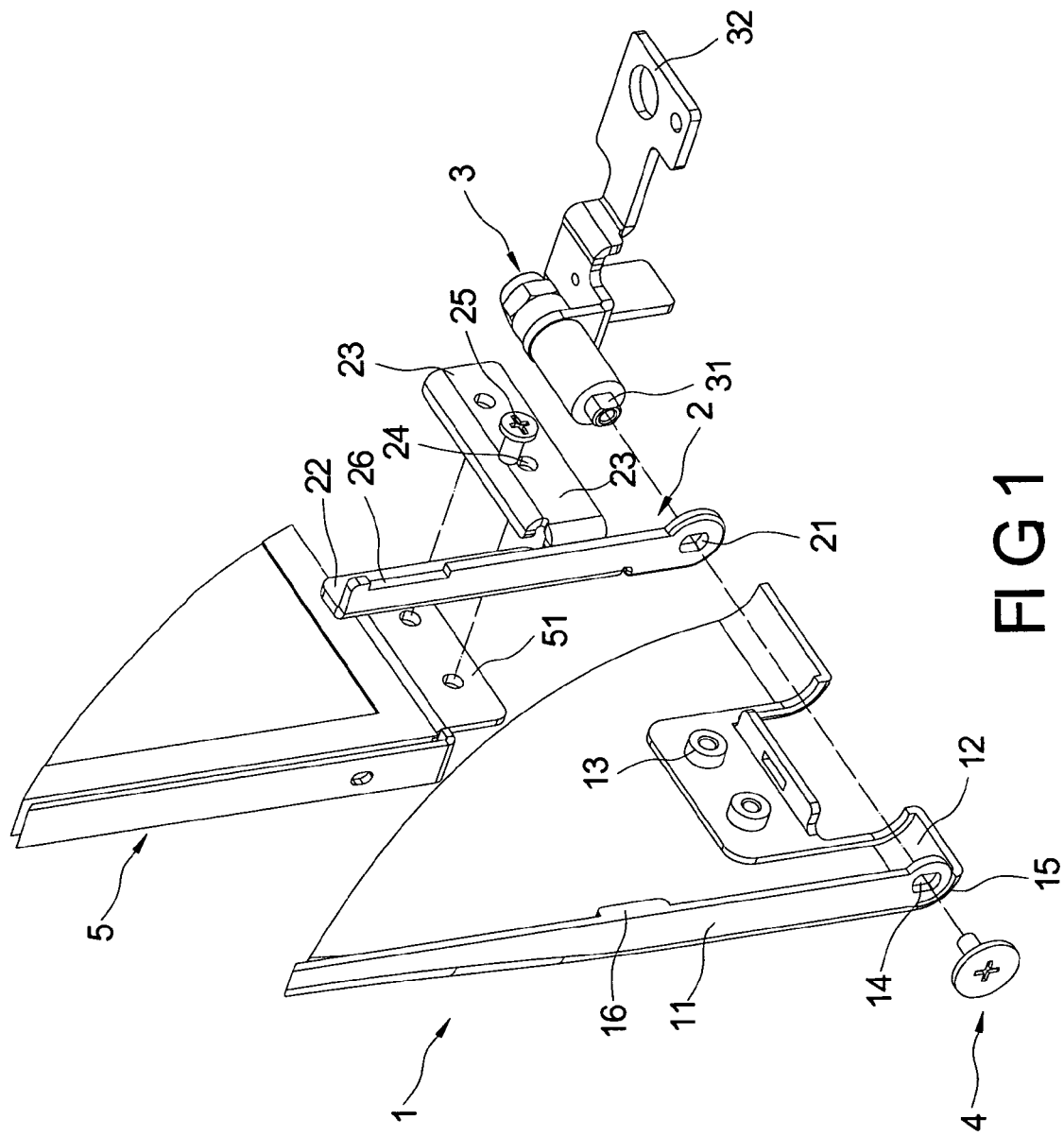
FIG. 1 is an exploded perspective view showing a shaft structure of a liftable screen cover in accordance with the present invention.
Figure 2:
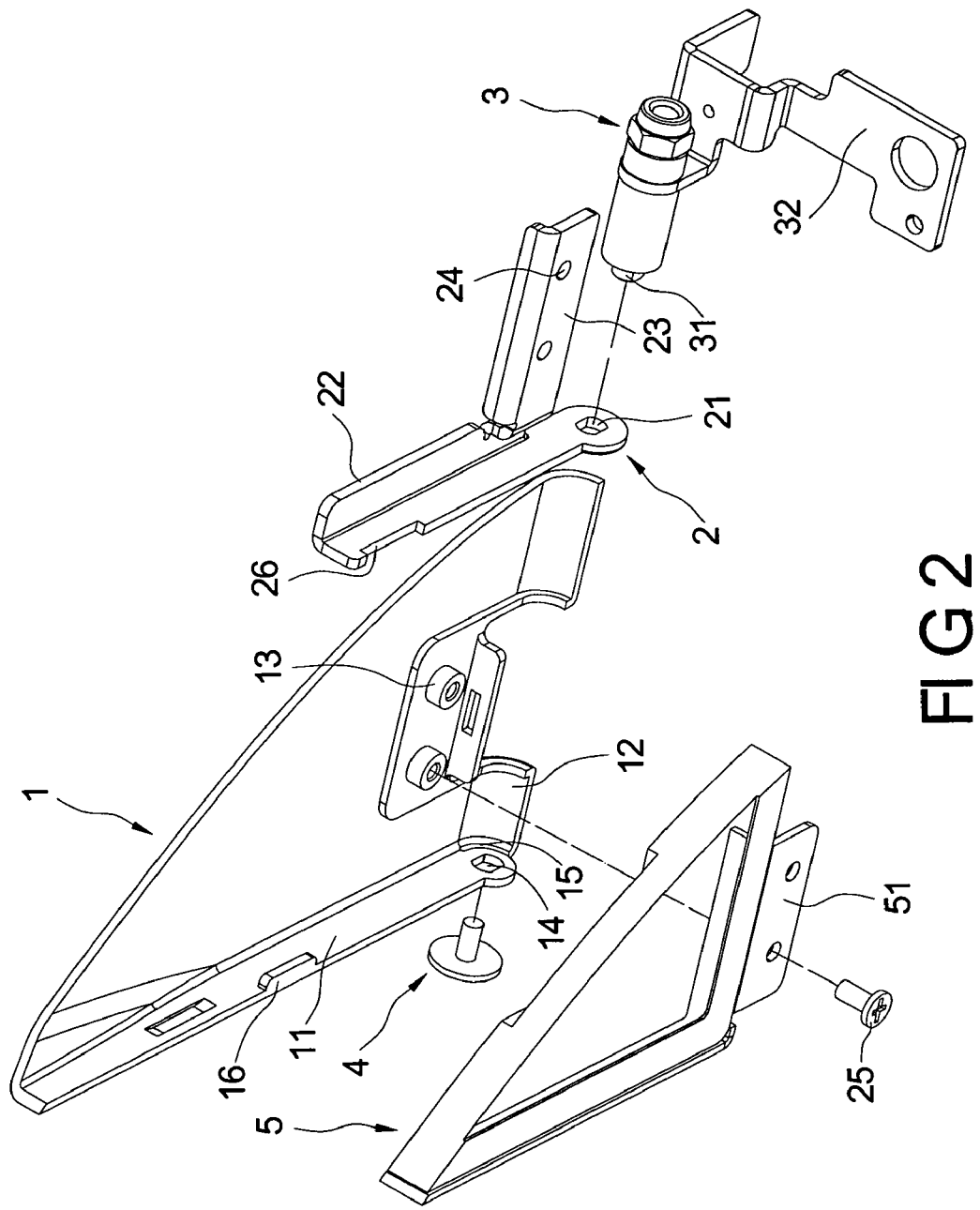
FIG. 2 is an exploded perspective view showing another view angle of the shaft structure of a liftable screen cover in accordance with the present invention.
Figure 3:
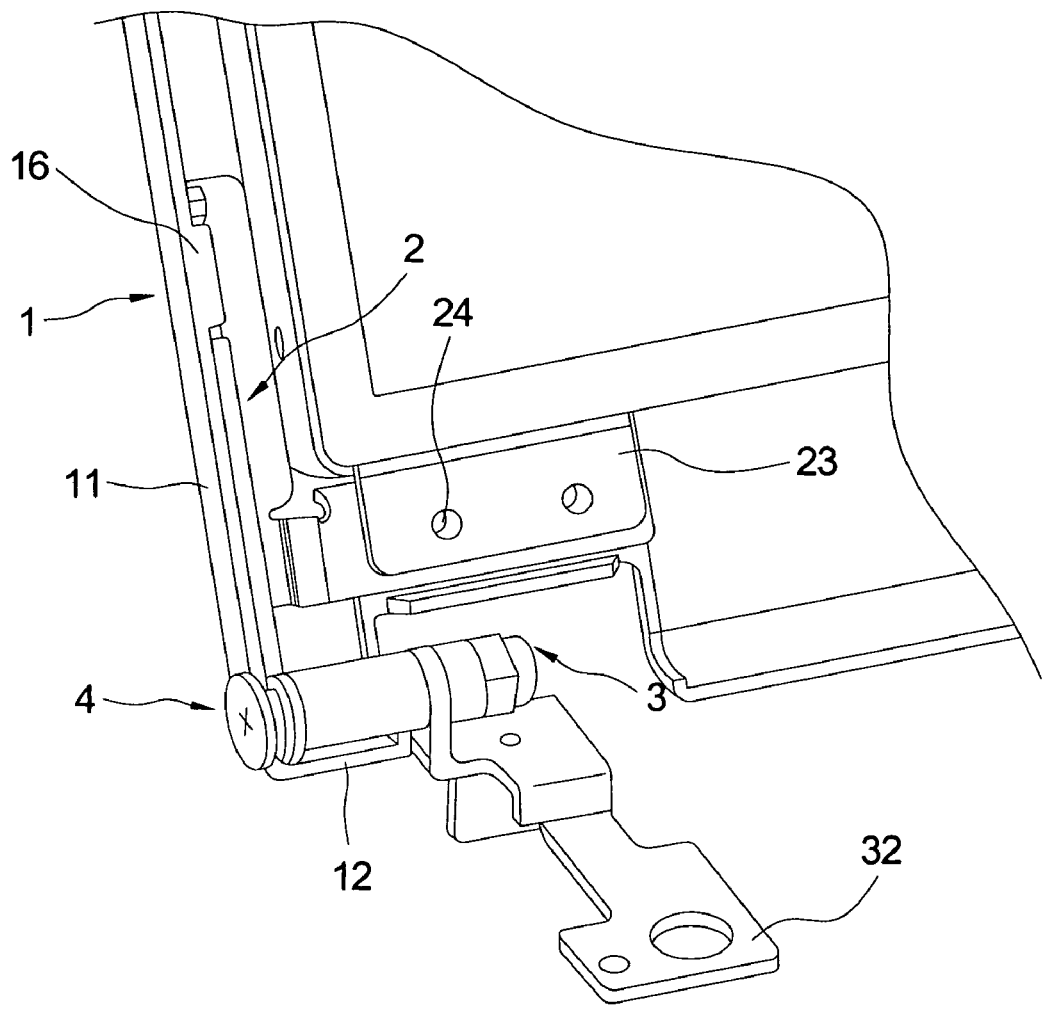
FIG. 3 is an assembled perspective view showing a shaft structure of a liftable screen cover in accordance with the present invention.
Figure 4:
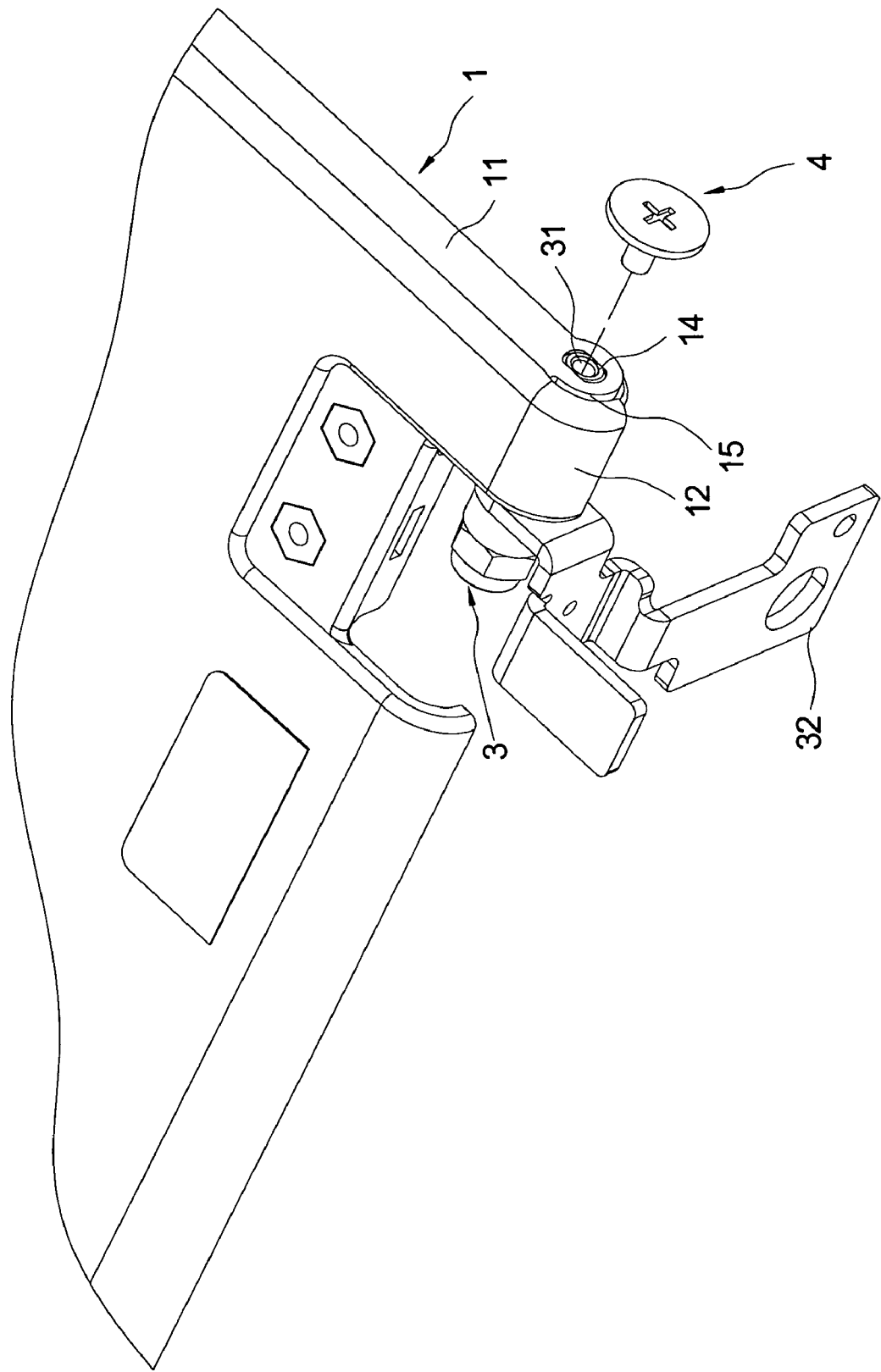
FIG. 4 is an assembled perspective view showing another view angle of the shaft structure of a liftable screen cover in accordance with the present invention.

With reference to FIGS. 1 to 4, the present invention provides a shaft structure of a liftable screen cover, which comprises a screen cover 1, a cover reinforcement plate 2, a shaft set 3 and a fixing element 4. The screen cover 1 can be a thin plate screen cover made by press-forming the aluminum alloy, a thin plate screen cover made by hot-forming the magnesium alloy or a screen cover made by molding carbon fibers. The inside of the screen cover 1 is suitably fixed with a LCD screen 5. Both sides of the screen cover 1 are each formed with a bent sidewall 11. The bottom of the screen cover 1 is formed with a folded edge 12 having a curved profile. The bottom of the screen cover 1 is provided with two fixing pillars 13 adjacent to the sidewall 11 for fixing the LCD screen 5 and the cover reinforcement plate 2.

One side of the sidewall 11 is provided with a first hole 14. The first hole 14 is a non-circular hole with both sides flattened. One end of the sidewall 11 is provided with a crack-stopping groove 15. The crack-stopping groove 15 is provided between the sidewall 11 and the folded edge 12. A fulcrum portion 16 protrudes from the edge of the sidewall 11. The fulcrum portion 16 is a protrusion. The shape and structure of the fulcrum portion are not restricted, so that they can change into suitable forms. The fulcrum portion 16 is provided on the sidewall 11 at a position far from the first hole (shaft center) 14, so that a longer force arm can be formed between the fulcrum portion 16 and the first hole 14.

The cover reinforcement plate 2 is made of metallic or other materials and formed into an elongated plate. The cover reinforcement plate 2 is provided inside the sidewall 11. On end of the cover reinforcement plate 2 is provided with a second hole 21 to correspond to the first hole 14. The second hole 21 is also a non-circular hole with two sides flattened. A folded piece 22 further vertically extends from one side of the cover reinforcement plate 2, so that the cross section of the cover reinforcement plate 2 and the folded piece 22 can be formed into a L-lettered shape. With the above structure, its strength is increased. A fixing piece 23 further vertically extends from one side of the cover reinforcement plate 2. The fixing piece 23 is provided with two fixing holes 24. With the screws 25 penetrating through the fixing holes 24 and the fixing plate 51 of the LCD screen 5 to screw onto the fixing pillars 13, the cover reinforcement plate 2 can be screwed and fixed on the screen cover 1, thereby to fix the LCD screen 5.

The other side of the cover reinforcement plate 2 is recessed to form an accommodating groove 26 to correspond to the fulcrum portion 16 of the sidewall 11. The accommodating groove 26 is provided on the cover reinforcement plate 2 at a position far from the second hole 21. The fulcrum portion 16 of the sidewall 11 is provided in the accommodating groove 26, so that the fulcrum portion 16 abuts against the cover reinforcement plate 2 at a position far from the second hole (shaft center) 21, thereby to form a fulcrum connected in a male-and-female engagement. Among the fulcrum portion 16, the accommodating groove 26, the first hole 14 and the second hole 21, a longer force arm is formed, so that the fulcrum of the shaft can be greatly elongated. Further, the fulcrum portion 16 and the accommodating groove 26 are interchangeable. That is, the fulcrum portion 16 can be provided on the cover reinforcement plate 2, and the accommodating groove 26 can be provided on the sidewall 11. As a result, a fulcrum connected in a male-and-female engagement can be formed.

The shaft set 3 is made by lathing metallic materials. One end of the shaft center of the shaft set 3 has a flange 31 to correspond to the first hole 14 and the second hole 21. The flange 31 is non-cylindrical pillar with both sides flattened. The inside of the flange 31 has a thread. The shaft set 3 is pivoted to a connecting piece 32. The connecting piece 32 is used for fixing to the base (not shown) of a notebook, so that the shaft set 3 can be connected to the base. The flange 31 of the shaft set 3 penetrates into the second hole 21 and the first hole 14.

The fixing element 4 is a screw. The fixing element 4 is screwed to the thread inside the flange 31 of the shaft set 3. In this way, the fixing element 4 penetrates though and thus fixes the shaft set 3, the cover reinforcement plate 2 and the screen cover 1. The fixing element 4 can also be a rivet; so that the shaft set 3, the cover reinforcement plate 2 and the screen cover 1 can be fixed by riveting. With the above constitution, the shaft structure of the liftable screen cover of the present invention can be formed.

In the present invention, the side edge of the screen cover 1 is formed with a sidewall 11. The sidewall 11 is provided with a non-circular first hole 14. The inside of the screen cover 1 is provided with the cover reinforcement plate 2. The cover reinforcement plate 2 is correspondingly provided with a non-circular second hole 21 for resisting the wear and supporting. The flange 31 of the shaft set 3 directly penetrates the second hole 21 of the cover reinforcement plate 2 and the first hole 14 of the screen cover 1. The fixing element 4 is used to fix the shaft set 3, the cover reinforcement plate 2 and the screen cover 1. With the above arrangement, a structure that has a good rigidity and bears larger torsion can be formed.

Further, in the present invention, the screen cover 1 is particularly provided with a fulcrum portion 16 for abutting against the cover reinforcement plate 2 at a position far from the second hole (shaft center) 21. As a result, the fulcrum of the shaft can be greatly elongated to achieve a better reinforcing effect, and having a better rigidity and fixing effect. Therefore, in twisting the screen, the deformation and vibration of the screen cannot occur, and the screw for fixing the shaft will not get loosened. Further, in the present invention, the sidewall 11 of the screen cover 1 is provided with a crack-stopping groove 15, which can overcome the problems in manufacturing, make it easy to form, make the shaft as close as possible to the bottom of the screen cover 1 and save the space.

Further, the present invention additionally provides only one cover reinforcement plate 2 to achieve the reinforcing effect to a significant extent. The structure of the present invention is simple and easy to assemble, and thus the manufacturing cost can be effectively reduced.

Although the present invention has been described with reference to the foregoing preferred embodiment, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A shaft structure of a liftable screen cover, comprising:
 a screen cover having a sidewall bent and formed at a side of the screen cover, the sidewall having a non-circular first hole at one end thereof and a fulcrum portion;
 a cover reinforcement plate placed inside the sidewall, the cover reinforcement plate having a non-circular second hole at one end thereof and an accommodating groove at a position far from the second hole for accommodating the fulcrum portion of the sidewall, wherein the cover reinforcement plate is connected to the sidewall of the screen cover for reinforcing the screen cover; and
 a shaft set having a non-circular flange at one end thereof, the flange of the shaft set penetrating into the second hole of the cover reinforcement plate and the first hole of the screen cover.

2. The shaft structure of a liftable screen cover according to claim 1, wherein the screen cover is a thin plate screen cover made by press-forming the aluminum alloy, a thin plate screen cover made by hot-forming the magnesium alloy or a screen cover made by molding carbon fibers.

3. The shaft structure of a liftable screen cover according to claim 1, wherein the screen cover has a folded edge with a curved shape on a bottom thereof, the sidewall is provided with a crack-stopping groove at one end thereof, and the crack-stopping groove is provided between the sidewall and the folded edge.

4. The shaft structure of a liftable screen cover according to claim 1, wherein the screen cover is provided with fixing pillars adjacent to the sidewall on a bottom thereof, a fixing piece extends from one side of the cover reinforcement plate, the fixing piece is provided with fixing holes, and screws penetrate the fixing holes to screw the fixing piece onto the fixing pillars.

5. The shaft structure of a liftable screen cover according to claim 1, wherein one folded piece vertically extends from one side of the cover reinforcement plate.

6. The shaft structure of a liftable screen cover according to claim 1, wherein the shaft set is pivoted to a connecting piece.

7. The shaft structure of a liftable screen cover according to claim 1, wherein a fixing element is used to fix the shaft set, the cover reinforcement plate and the screen cover.

8. The shaft structure of a liftable screen cover according to claim 7, wherein the fixing element is a screw or rivet.

9. A shaft structure of a liftable screen cover, comprising:
 a screen cover having a sidewall bent and formed at a side of the screen cover, the sidewall having a non-circular first hole at one end thereof and an accommodating groove;
 a cover reinforcement plate placed inside the sidewall, the cover reinforcement plate having a non-circular second hole at one end thereof and a fulcrum portion at a position far from the second hole for being accommodating in the accommodating groove of the sidewall, wherein the cover reinforcement plate is connected to the sidewall of the screen cover for reinforcing the screen cover; and a shaft set having a non-circular flange at one end thereof, the flange of the shaft set penetrating into the second hole of the cover reinforcement plate and the first hole of the screen cover.

* * * * *